L. BINDER.
METHOD OF AND APPARATUS FOR REGULATING THE COMMUTATING FIELD IN DIRECT CURRENT COMMUTATOR MACHINES.
APPLICATION FILED SEPT. 28, 1911.
1,188,396.
Patented June 27, 1916.
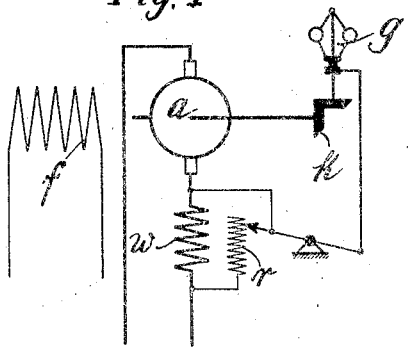
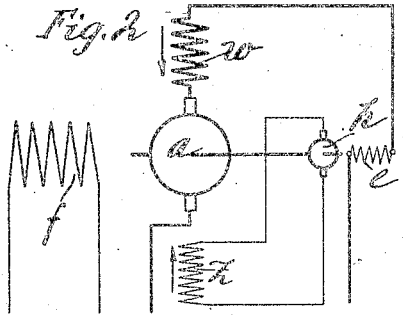
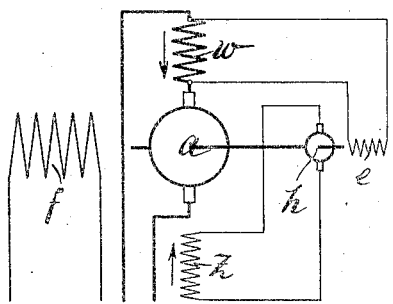
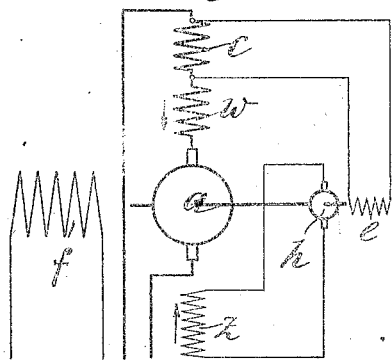
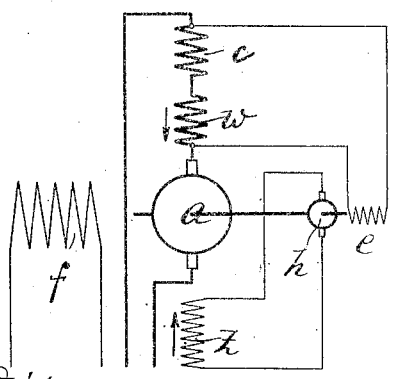
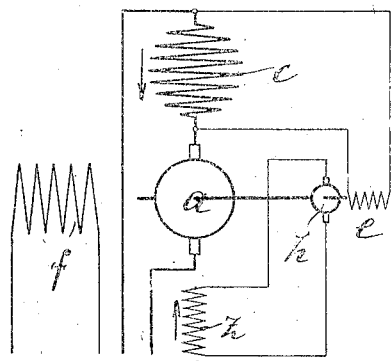
Witnesses:
H. Alfred Jauke
Emanuel M. Fenster
Inventor
Ludwig Binder
by Joseph V. Ross
his attorneys.

UNITED STATES PATENT OFFICE.

LUDWIG BINDER, OF CHARLOTTENBURG, GERMANY, ASSIGNOR TO SIEMENS-SCHUCKERT WERKE G. M. B. H., OF BERLIN, GERMANY, A CORPORATION OF GERMANY.

METHOD OF AND APPARATUS FOR REGULATING THE COMMUTATING FIELD IN DIRECT-CURRENT COMMUTATOR-MACHINES.

1,188,396.  Specification of Letters Patent.  Patented June 27, 1916.

Application filed September 28, 1911. Serial No. 651,794.

*To all whom it may concern:*

Be it known that I, LUDWIG BINDER, a subject of the German Emperor, and residing at Charlottenburg, near Berlin, Germany, have invented a certain new and useful Improved Method of and Apparatus for Regulating the Commutating Field in Direct-Current Commutator-Machines, of which the following is a specification.

My invention relates to methods and apparatus for regulating the commutating field in direct-current machines.

It is well-known that in alternating-current commutator machines the commutating field must be varied with the speed, and means have been proposed for adjusting that commutating field which is most favorable for each speed. In alternating-current commutator machines, however, the commutating poles have a double duty to perform. They should equalize firstly the reactance voltage for obtaining a correct commutation of current, as in direct-current machines, and, secondly, the transformer voltage which is generated by the varying field of the main poles in the short-circuited armature coils. As is well-known, the commutating field requisite for the latter purpose is dependent on the speed, and the object of the above-mentioned means in alternating-current machines always is to adjust a commutating field which is correct for destroying the transformer voltage independently of the speed.

In direct-current machines the reactance voltage only is present. The commutating field requisite for destroying this voltage was heretofore regarded as independent of the speed. This assumption, however, is incorrect. On the contrary, it has been found that the commutating field must be made dependent not only on the current as usual, but also on the speed, so that the reactance voltage is correctly compensated at each speed. To this end, according to my invention I regulate the energizing ampere turns of the commutating fields or their magnetic resistance according to the speed.

Some forms of apparatus and their connections for carrying my invention into practice are diagrammatically represented as an example in the accompanying drawing, wherein:—

Figure 1 shows a variable resistance in parallel with the energizing windings of the commutating fields; Fig. 2 shows an arrangement of an auxiliary machine for influencing the ampere turns of the commutating fields, Figs. 3, 4, 5 and 6 shown arrangements similar to that shown in Fig. 2 with the field winding of the auxiliary machine placed in shunt to the main circuit.

In the connection according to Fig. 1 the commutating-pole winding $w$, and if desired also the compensating winding, connected as usual in series with the armature $a$, are so designed that commutating fields of the correct strength are produced at the lowest speed which occurs. As the speed increases the ampere turns in the winding $w$ are then diminished with an increasing speed in a manner known in itself by the variable resistance $r$ connected in parallel which can be brought about by a centrifugal governor $g$, driven by armature $a$, which more and more diminishes the resistance $r$.

In the connection according to Fig. 2 the commutating poles have besides the normal winding $w$ an additional winding $z$ fed by an auxiliary machine $h$. This auxiliary machine is directly or indirectly coupled with the main machine and as this figure shows is energized by the winding $e$ by the armature current or in dependence thereon. The additional winding $z$ of the commutating poles is so connected that its action opposes that of the main winding. As the speed increases the voltage of the auxiliary machine and the current in the auxiliary winding increases whereby the commutating field is weakened.

The arrangement according to Fig. 2 has the disadvantage that the energizing winding of the auxiliary machine which is traversed by the main current must be made with a correspondingly large section. This disadvantage which is particularly felt in designing the auxiliary machine can be obviated by shunting the exciting winding of the auxiliary machine from the terminals of a resistance to which the feeder is connected. Figs. 3 and 4 show such forms of the invention.

In Fig. 3 the field winding $e$ of the auxiliary machine $h$ is connected to the terminals of the commutating pole winding $w$ of the main machine $a$. $e$ again designates the additional winding of the commutating poles which is fed by the auxiliary machine $h$ and which then regulates the commutating field in dependence on the speed.

In the form shown in Fig. 4 the exciting winding $e$ of the auxiliary machine is connected in shunt with and fed by the compensation winding $c$ of the main machine. As shown in Fig. 5, the exciting winding $e$ may be connected in shunt with and fed by the commutating-pole winding $w$ connected in series with the compensation winding $c$ of the main machine. In all cases these windings can be well designed in practice on account of the weak currents traversing the exciting winding of the auxiliary machine.

In general, it will be less convenient to regulate the commutating fields by varying their magnetic resistance than by varying the exciting ampere turns as described above.

It is to be understood that my invention relates not only to machines having outwardly well-defined commutating poles, but also to all machines having special commutating fields which are dependent on the armature current and, for example, can be produced by a uniformly distributed compensation winding with over-excitation such as shown in Fig. 6 at $c$. This figure shows otherwise the auxiliary pole arranged similar to the manner shown in Fig. 3.

I claim:—

1. The herein described method of suppressing sparking in continuous current commutator machines having commutating poles, which consists in weakening the field strength of said poles with increasing speed of said machine.

2. The herein described method of suppressing sparking in continuous current commutator machines with commutating poles, which consists in weakening and strengthening the field strength of said poles with increasing and decreasing speed of said machine respectively.

3. The herein described method of suppressing sparking in continuous current commutator machines with commutating poles and windings therefor, which consists in decreasing and increasing the effective ampere turns of said windings with increasing and decreasing speed of said machine respectively.

4. In a continuous current commutator machine with commutating poles and windings therefor, the combination with a regulating device coupled to the shaft of said machine, of means for varying the effective ampere turns of said windings in dependence from said regulating device so as to decrease said effective ampere turns with increasing speed of said machine and to increase said effective ampere turns with decreasing speed of said machine.

5. In a continuous current commutator machine with commutating poles and windings therefor, the combination of an auxiliary dynamo coupled with said machine, electrical connections between said dynamo and said windings, said connections being arranged to weaken the commutating field with increasing speed and strengthen it with decreasing speed.

6. In a continuous current commutator machine, the combination of commutating poles and a main winding therefor, said main winding being connected in series with the armature, with an additional winding for said commutating poles, and means for exciting said additional winding in opposition to said main winding, said means being operatively depending upon the speed of said machine.

7. In a continuous current commutator machine, the combination of commutating poles with a main winding for said poles in series with the armature, an additional winding for said poles, an auxiliary dynamo geared with said machine, the field of said dynamo being connected in shunt to said main winding and said additional winding being excited by said dynamo so as to obtain at increasing speed of said machine a current which is in opposition to that flowing in said main winding.

In testimony whereof I have signed my name to this specification in the presence of two witnesses.

LUDWIG BINDER.

Witnesses:
  WOLDEMAR HAUPT,
  BRUER A. BRUER.